United States Patent [19]

Uchida et al.

[11] Patent Number: 4,726,016
[45] Date of Patent: Feb. 16, 1988

[54] CONFERENCE SYSTEM

[75] Inventors: Seiya Uchida, Akishima; Koichi Sekiguchi, Asaka; Masaharu Kamigaki, Tokyo, all of Japan

[73] Assignee: Iwatsu Electric Clock Co., Ltd., Tokyo, Japan

[21] Appl. No.: 783,912

[22] Filed: Oct. 3, 1985

[30] Foreign Application Priority Data

Oct. 11, 1984 [JP] Japan .............................. 59-211444
Oct. 11, 1984 [JP] Japan .............................. 59-211445

[51] Int. Cl.$^4$ ............................................ H04Q 11/04
[52] U.S. Cl. ....................................................... 370/62
[58] Field of Search ...................... 370/62; 179/18 BC; 379/202, 203, 204, 205, 206

[56] References Cited

U.S. PATENT DOCUMENTS

| | | | |
|---|---|---|---|
| 3,958,084 | 5/1976 | Nicholas | 370/62 |
| 4,359,603 | 11/1982 | Heaton | 370/62 |
| 4,481,624 | 11/1984 | Baranyai et al. | 370/62 |
| 4,545,050 | 10/1985 | van Baardewijk et al. | 370/62 |

Primary Examiner—Douglas W. Olms
Attorney, Agent, or Firm—Emmanuel J. Lobato; Robert E. Burns

[57] ABSTRACT

A conference system, in which a buffer memory is connected to the input-output of each highway for storing all its channel data for each frame. The stored data is time-divided so that a time-length obtained by dividing one frame length by an appropriate number (for example, eight) may be the operation time length of each trunk, thereby implementing real-time processing a number of trunks. Conference circuits capable of inhibiting an output for each channel are connected in parallel to the highways. During an ordinary two-party communication operation an output on the corresponding channel of the conference circuit is inhibited, and during a conference operation an output on the corresponding channel of the highway switching circuit is inhibited, by which channels allocated to telephone sets or CO lines are used for the conference without the necessity of providing channels specifically therefor.

1 Claim, 13 Drawing Figures

Fig. 8B (4) ROM

|  | 6 | 0 |
|---|---|---|
| $0000 | LOSS $y_0$ dB | |
| $2000 | LOSS $y_1$ dB | |
| $4000 | LOSS $y_2$ dB | |
| $6000 | LOSS $y_3$ dB | |
| $8000 | LOSS $y_4$ dB | |
| $A000 | LOSS $y_5$ dB | |
| $C000 | LOSS $y_6$ dB | |
| $E000 | LOSS $y_7$ dB | |

⎫ LMT
⎬ (LINEAR-TO-μ LAW CODE)
⎭

|  | 12 | 0 |
|---|---|---|
| $10000 | LOSS $x_0$ dB | |
| $10080 | LOSS $x_1$ dB | |
| $10100 | LOSS $x_2$ dB | |
| $10180 | LOSS $x_3$ dB | |
| $10200 | LOSS $x_4$ dB | |
| $10280 | LOSS $x_5$ dB | |
| $10300 | LOSS $x_6$ dB | |
| $10380 | LOSS $x_7$ dB | |

⎫ MLT
⎬ (μ LAW-TO-LINEAR CODE)
⎭

Fig. 9

|    | T0 | T1 | T2 | T3 |
|----|----|----|----|----|
| S0 | • READ PORT NO. AND ID OF A FROM TKM | • READ DATA OF A FROM INM<br>• 0→ADD | • (INM)→MLT (VARIABLE BY PLI)<br>• (MLT)→ASP | • (ASP)+(ADD)→ADD |
| S1 | • READ PORT NO. AND ID OF C FROM TKM | • READ DATA OF C FROM INM | • (INM)→MLT (VARIABLE BY PLI)<br>• (MLT)→CSP | • (CSP)+(ADD)→ADD |
| S2 | • READ PORT NO. AND ID OF A FROM TKM<br>• (ADD)-(ASP)→SPX | • (SPX)→LMT (VARIABLE BY PLO) | • (LMT)→OTM OF A | |
| S3 | • READ PORT NO. AND ID OF C FROM TKM<br>• (ADD)-(CSP)→SPX | • (SPX)→LMT (VARIABLE BY PLO) | • (LMT)→OTM OF C | |

|    | T4 | T5 | T6 | T7 |
|----|----|----|----|----|
| S0 | • READ PORT NO. AND ID OF B FROM TKM | • READ DATA OF B FROM INM | • (INM)→MLT (VARIABLE BY PLI)<br>• (MLT)→BSP | • (BSP)+(ADD)→ADD |
| S1 | • READ PORT NO. AND ID OF D FROM TKM | • READ DATA OF D FROM INM | • (INM)→MLT (VARIABLE BY PLI)<br>• (MLT)→DSP | • (DSP)+(ADD)→ADD |
| S2 | • READ PORT NO. AND ID OF B FROM TKM<br>• (ADD)-(BSP)→SPX | • (SPX)→LMT (VARIABLE BY PLO) | • (LMT)→OTM OF B | |
| S3 | • READ PORT NO. AND ID OF D FROM TKM<br>• (ADD)-(DSP)→SPX | • (SPX)→LMT (VARIABLE BY PLO) | • (LMT)→OTM OF D | |

Fig. 10

| COMMAND | MEANING | CONTENTS OF ACCESS |
|---|---|---|
| OUT30 | DESIGNATION OF TRUNK NO. | 7 6 5 4 3 2 1 0<br>→ POSITION NO. IN TRUNK (0~3)<br>→ POSITION NO. IN IC (0~7)<br>→ IC NO. (0~7) |
| OUT31 | DESIGNATION OF PORT NO. | 7 6 5 4 3 2 1 0<br>HWY No. (0~7) / CHANNEL No. (0~31) |
| OUT32 | PORT CONNECTION INFORMATION | 7 6 5 4 3 2 1 0 / m / n<br>→ PORT LOSS-I $x_n$ dB<br>→ PORT LOSS-O $y_m$ dB<br>→ 0=DISCONNECTION<br>1=CONNECTION } CONNECTION FLAG |

Fig. 11

|  | T0 | T1 | T2 | T3 |
|---|---|---|---|---|
| HIGHWAY CONTROL | • (HSP)→HWR | | | |
| CPU COMMAND | • if<br>(BSY1)=1<br>&(COMP)=1<br>or<br>(BSY1)=1<br>&(CON)$_3$=0<br>then<br>1→ACT<br>• (BSY0)→BSY1 | • (CTM)→CTR<br>• MODIFY DESIGNATED BIT OF CTR BY CHG | • if<br>(ACT)=1<br>then<br>(CHG)→CTM | • if<br>(COMP)=1<br>then<br>(PNO)→TKM$_{0-7}$<br>(CON)$_{0-7}$→TKM$_{8-14}$<br>• if<br>(BSY1)=1<br>then<br>0→BSY0 |
|  | T4 | T5 | T6 | T7 |
| HIGHWAY CONTROL | | | | • (OTM)→HPS<br>• (CTM)→HWG<br>• (HWR)→INM |
| CPU COMMAND | • if<br>(BSY1)=1<br>&(COMP)=1<br>or<br>(BSY1)=1<br>&(CON)$_3$=0<br>then<br>1→ACT<br>• (BSY0)→BSY1 | • (CTM)→CTR<br>• MODIFY DESIGNATED BIT OF CTR BY CHG | • if<br>(ACT)=1<br>then<br>(CHG)→CTM | • if<br>(COMP)=1<br>then<br>(PNO)→TKM$_{0-7}$<br>(CON)$_{0-7}$→TKM$_{8-14}$<br>• if<br>(BSY1)=1<br>then<br>0→BSY0 |

Fig. 12

(1) SPM

| | 7 | 0 |
|---|---|---|
| 0 | CH0 | HW 0 |
| 1 | CH0 | HW 1 |
| 2 | CH0 | HW 2 |
| 3 | CH0 | HW 3 |
| 4 | CH0 | HW 4 |
| 5 | CH0 | HW 5 |
| 6 | CH0 | HW 6 |
| 7 | CH0 | HW 7 |
| 8 | CH1 | HW 0 |
| 9 | CH1 | HW 1 |
| 252 | CH7 | HW 4 |
| 253 | CH7 | HW 5 |
| 254 | CH7 | HW 6 |
| 255 | CH7 | HW 7 |

| 7 | 4 3 | 0 |
|---|---|---|
| S | chord | step |

(2) CONM

| | 8 | 0 |
|---|---|---|
| 0 | CH0 | HW 0 |
| 1 | CH0 | HW 1 |
| 2 | CH0 | HW 2 |
| 3 | CH0 | HW 3 |
| 4 | CH0 | HW 4 |
| 5 | CH0 | HW 5 |
| 6 | CH0 | HW 6 |
| 7 | CH0 | HW 7 |
| 8 | CH1 | HW 0 |
| 9 | CH1 | HW 1 |
| 252 | CH7 | HW 4 |
| 253 | CH7 | HW 5 |
| 254 | CH7 | HW 6 |
| 255 | CH7 | HW 7 |

8 7 6 5 4 3 2 1 0

→ HIGHWAY NO. } PORT NO.
→ CHANNEL NO.

→ OUTPUT CONTROL FLAG
 ( 0 = DISCONNECTION )
 ( 1 = CONNECTION )

CONFERENCE SYSTEM

BACKGROUND OF THE INVENTION

The present invention relates to a conference system which utilizes a plurality of time division digital switches.

In recent years there has grown a demand for conference systems through a plurality of telephones. Conventionally conference systems of this kind generally have an arrangement in which transmitting and receiving highways are formed on a time division basis and communication signals on the receiving highway are conference-operated and delivered out in predetermined time slots through the transmitting highway. With this kind of conventional systems, however, it is very difficult to determine dynamically and flexibly the number of groups participating in a conference and the number of participants. As a solution to this problem, there has been proposed a method which employs a buffer memory in an input/output part associated with the highways, as disclosed in Japanese Pat. Pub. Disc. Nos. 28608/80 and 57072/82 gazettes. This method has solved the problem of flexibility. On the other hand, however, the above method requires the buffer memory and its control circuit to operate at high speed, leading to the defect of limitations on the semiconductor elements that can be used.

Moreover, in this kind of system heretofore employed, since a plurality of conference trunks are provided and exclusive channels are allocated to them, channels equal in number to (the number of conference trunks)×(the maximum number of conferees to be accommodated in one conference trunk) are needed for conference use, in addition to channels corresponding to telephone sets or CO lines. An attempt has also been made to use economically the channels for conference use, as set forth in Japanese Pat. Pub. Disc. No. 57072/82 gazette, but it still calls for conference use.

SUMMARY OF THE INVENTION

An object of the present invention is to provide, with a view for overcoming the abovesaid defects, a conference system which is highly flexible in the requirement for conference and easy to fabricate as an LSI and hence makes its equipment small and low-cost.

Another object of the present invention is to provide a conference system which obviates these defects, dispenses with exclusive channels for conference use and produces less voice delay.

In order to attain the above first object, according to the present invention, a buffer memory is connected to the input/output of each highway for storing its all channel data for each fram, and the stored data is time-divided so that a time-length obtained by dividing one frame length by an appropriate number (for example, eight) may be the operation time length of each trunk, thereby implementing real-time processing a number of trunks To attain the above second object, according to the present invention, a conference circuit capable of inhibiting outputs for each channel are connected in parallel to the highways. During an ordinary two-party communication an output on the corresponding channel of the conference circuit is inhibited, and during a conference operation an output on the corresponding channel of the highway switching circuit is inhibited, by which channels allocated to telephones sets or CO lines are used for the conference without the necessity of providing channels specifically therefore.

BRIEF DESCRIPTION OF THE DRAWINGS

The present invention will be described in detail below in comparison with conventional art with reference to the accompanying drawings, in which.

DETAILED DESCRIPTION

To make differences between conventional art and the present clear, an example of conventional art will first be described.

Figure 1:
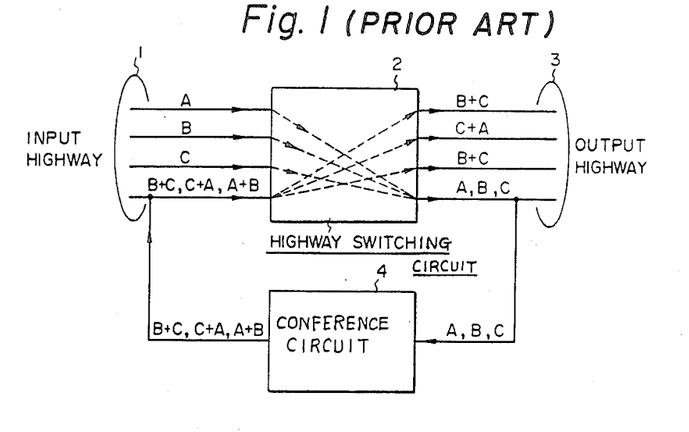
FIG. 1 is a block diagram illustrating an example of the arrangement of a conventional conference system.

In the conventional system, a conference trunk is connected, as shown in FIG. 1, and a participant's signal provided on an input highway 1 is input into a conference circuit 4 from an output highway 3 at the timing of a channel which is allotted by a highway switching circuit 2 to the conference circuit 4. The signal, after being conference-operated, is returned to the input highway 1 at the timing of the channel allotted to the conference circuit 4, from which it is delivered to participants via the highway switching circuit 2 and the output highway 3. FIG. 1 shows, in the interest of clarity, the case where the number of participants is three, their voice signals are identified by A, B and C, respectively, and are each assigned to a particular one of channels of three highways.

As shown in this example, a voice delay in the conventional system is (the time necessary for the highway switching circuit 2 )×2+(the time necessary for the conference circuit), which is more than twice than that in an ordinary two-party communication.

With reference to the accompanying drawings, the present invention will hereinafter be described in detail.

Figure 2:
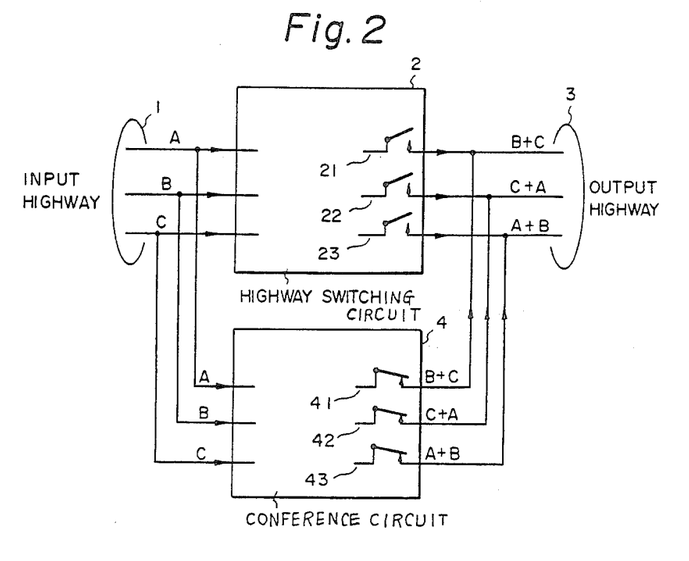
FIG. 2 is a block diagram illustrating the general arrangement of the conference system of the present invention.

FIG. 2 shows the concept of the present invention. A participant's signal provided on the input highway 1 is supplied into the highway switching circuit 2 and the conference circuit 4 at the same time. In this instance, output switches 21, 22 and 23 of the highway switching circuit 2 are each turned OFF and output switches 41, 42 and 43 of the conference circuit 4 are each turned ON at the timing of the participant's channel of the output highway. Furthermore, a signal conference-operated in the conference circuit 4 is output at the timing of the participant's channel of the output highway. FIG. 2 shows, in the interest of clarity, a case where the number of participant's is three and their voice signals are identified by A, B and C, respectively, and are each assigned to a particular one of three channels of the highway.

As is evident from FIG. 2, since the conferee's signal is not applied to the highway switching circuit 2 but is input directly into the conference circuit 4, the voice delay is less than that in the example shown in FIG. 1.

TABLE 1

| Symbol | Designation |
| --- | --- |
| ADD | Adding Register |
| BD | Bus Driver |
| CHG | Bit Change Circuit |
| CNT | Counter |
| COMP | Comparator |
| CON | Connection Information Register |
| CTM | Control Memory |
| CTR | Control Memory Register |
| DEC | Decoder |
| FA | Adder |
| HPS | Parallel-Serial Converter |
| HSP | Serial-Parallel Converter |
| HWG | Highway Gate Flip-Flop |
| HWR | Highway Register |
| INM | Input Memory |
| LMT | µ-Law to Linear Code Translation Table |
| MLT | Linear to µ-Law Code Translation Table |
| MPX | Multiplexer |
| NBD | Negative Bus Driver |
| OTM | Output Memory |
| PNO | Port Number Register |
| RHWY | Input Highway |
| ROM | Read-Only Memory |
| SPR | Speech Register File |
| THWY | Output Highway |
| TKM | Trunk Memory |
| TNO | Trunk Number Register |

Figure 3:
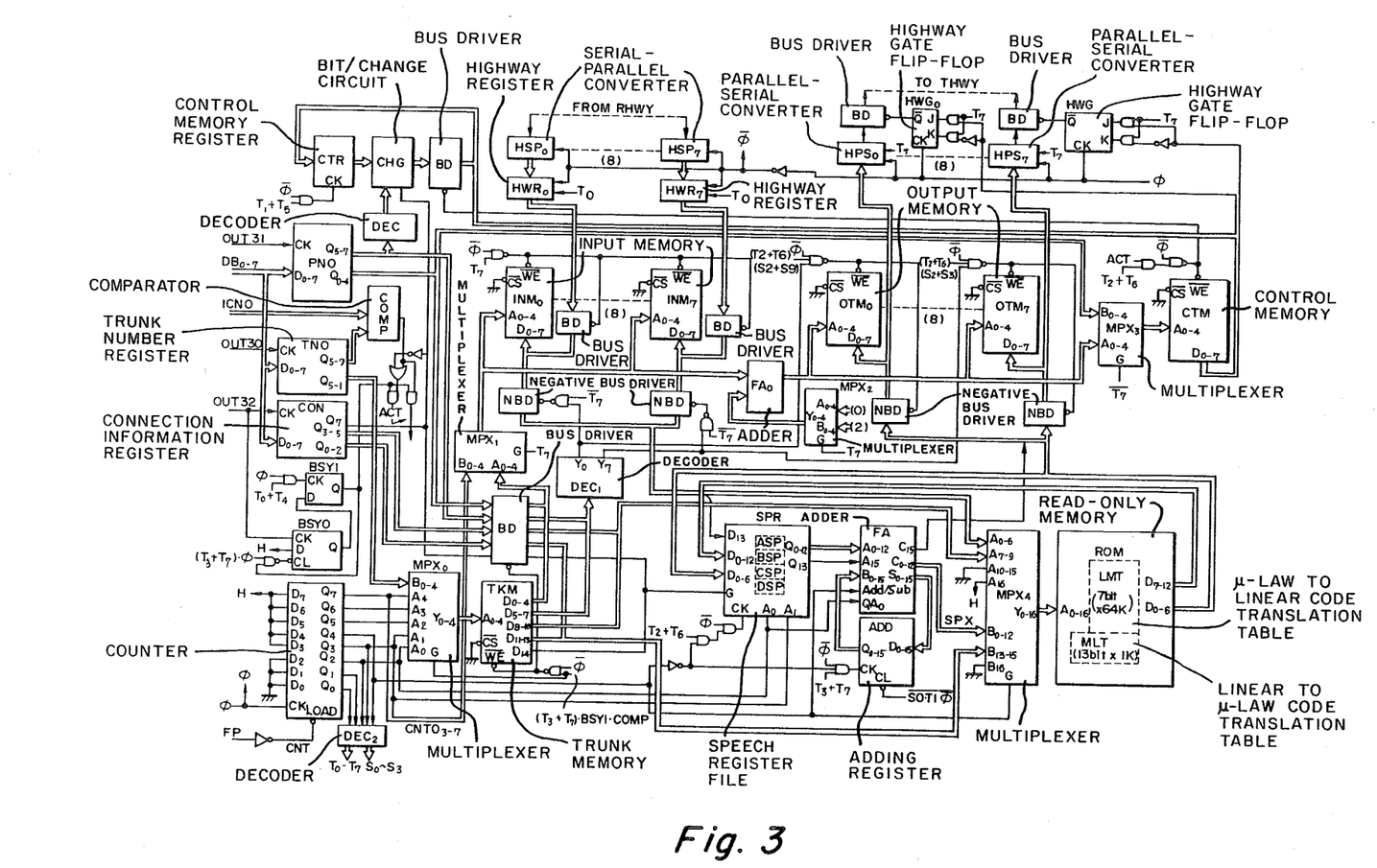
FIG. 3 is a block diagram showing an example of a conference circuit for use in the present invention.

FIG. 3 illustrates an embodiment of the conference circuit 4 for use in the present invention, and designations of symbols used therein are given in Table 1.

The conference circuit 4 dipicted in FIG. 3 is used, along with a highway switching circuit for controlling eight highways (32 channels/highway), and includes eight conference trunks (four participants/trunk).

The highway is divided into input highways and output highways, and though not shown, codecs corresponding to telephone sets or CO lines are each assigned to port number (the highway number +the channel number) by a fixed time slot system. Each codec performs transmission and reception of PCM data between it and the input/output highway at the timing of a channel determined by the port number. Further, PCM companding follows the µ-law.

Figure 4:
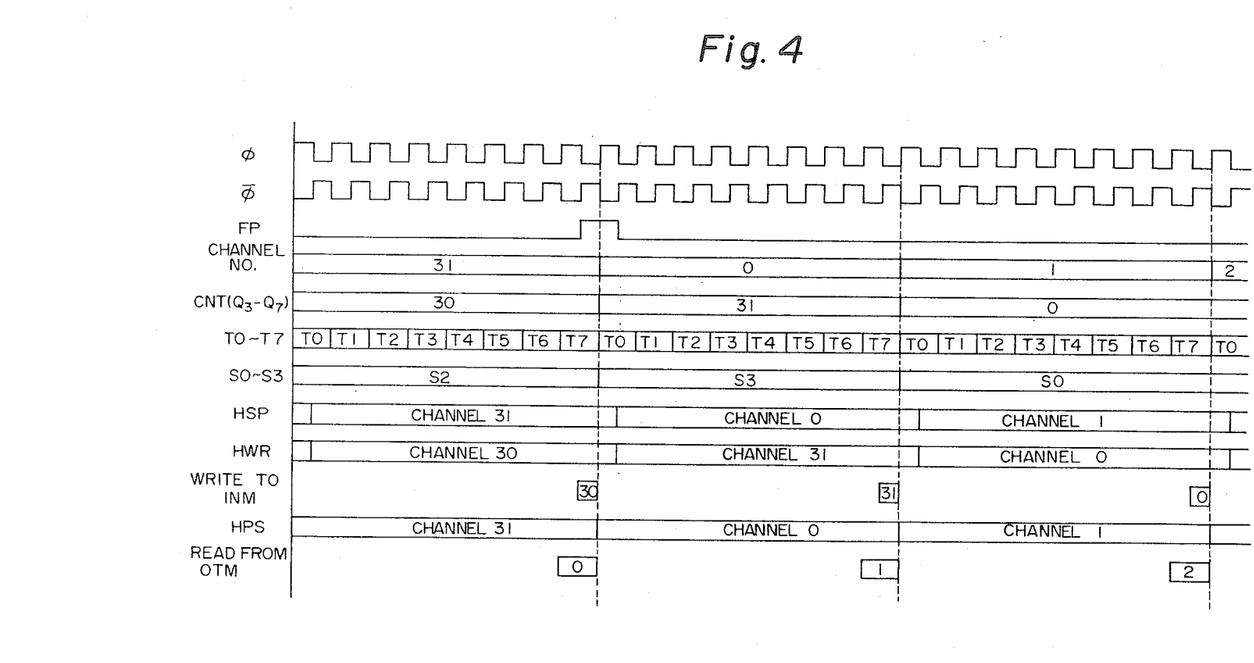
FIG. 4 is a timing chart showing the operation of the circuit exemplified in FIG. 3.

A description will be given, with reference to FIG. 3, of the operation of the conference circuit. A counter (CNT) operates on external clock timings of $\phi$ and frame pulses (FP), and timings $T_0$ to $T_7$ and timings $S_0$ to $S_3$ are created by a decoder ($DEC_2$). The above timing relation is shown in FIG. 4. Data on an input highway (RHWY) from a codec of each port is converted by one of serial-parallel converters ($HSP_0$ to $SHP_7$) which operate on clock timings of $\phi$ and is transferred to one of highway registers ($HWR_0$ to $HWR_7$) at the timing $T_0$.

Figure 5:
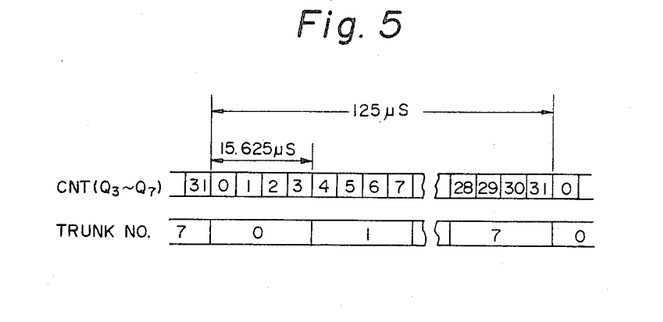
FIG. 5 is a timing chart showing the allocation of operation time in the circuit exemplified in FIG. 3.
Figure 8A:
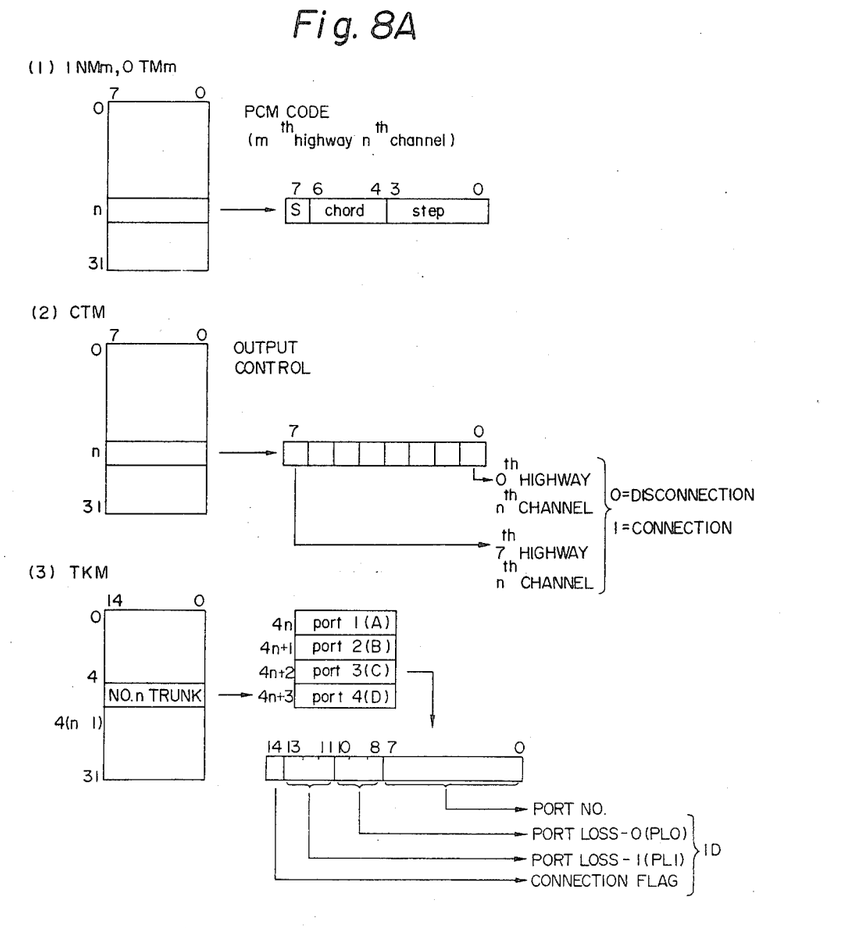
FIGS. 8A & 8B are diagrams showing memory maps of memories used in FIG. 3.
Figure 8B:
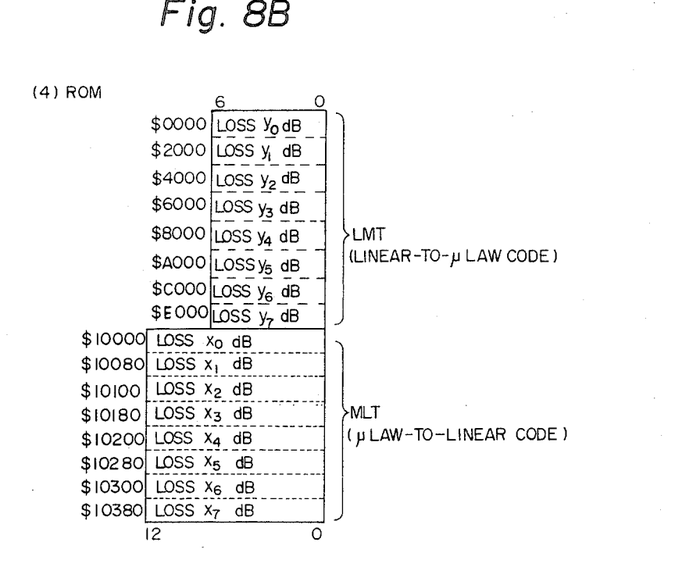
Figure 9:
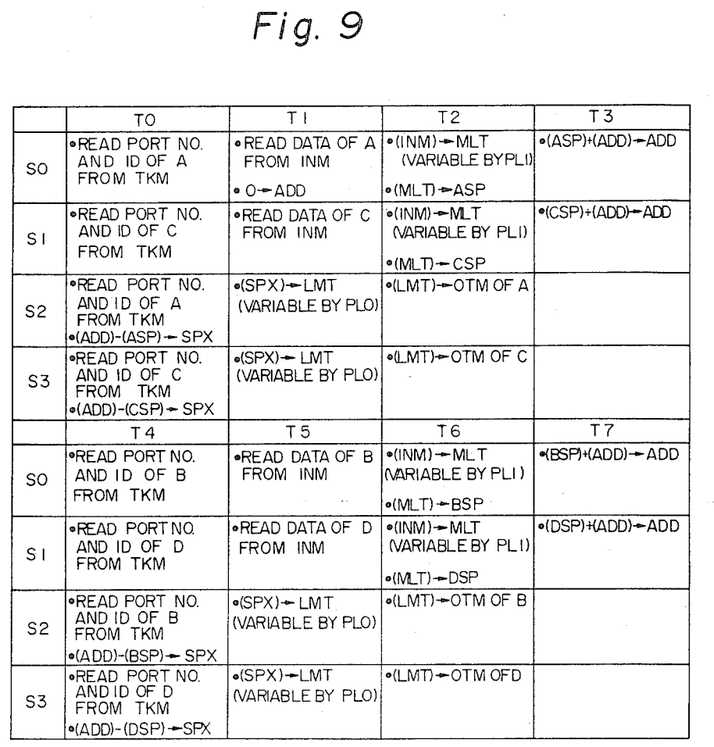
FIGS. 9 and 11 are charts explanatory of the circuit operation in FIG. 3.

To input memories ($INM_0$ to $INM_7$) are supplied addresses from the counter (CNT) via a multiplxer ($MPX_1$) at the timing $T_7$ and the data in the highway registers ($HWR_0$ to $HWR_7$) is stored into the input memories ($INM_0$ to $INM_7$) in such a format as shown in FIG. 4. Since the counter (CNT) operates as shown in the timing chart of FIG. 4, data of 32 channels is sequentially loaded into the input memories ($INM_0$ to $INM_7$) within one frame period 125 µs. Of the data stored in the input memories ($INM_0$ to $INM_7$), data of conference-participating ports is subjected to conference processing described later and then stored in output memories ($OTM_0$ to $OTM_7$) corresponding to the conference-participating ports. The output memories ($OTM_0$ to $OTM_7$) are each supplied with, as an address, a value which is obtained by adding "2" in an adder ($FA_0$) to a value applied thereto from the counter (CNT) via the multiplexer ($MPX_1$) at the timing $T_7$, and the corresponding data stored in one of the output output memories ($OTM_0$ to $OTM_7$) is transferred to one of parallel-serial converters ($HPS_0$ to $HPS_7$). On the other hand, when the output memories ($OTM_0$ to $OTM_7$) are read out, the same address as that applied to the output memories ($OTM_0$ to $OTM_7$) is also applied via a multiplexer ($MPX_3$) to a control memory (CTM), at the same timing as the readout of the output memories ($OTM_0$ to $OTM_7$), by which the corresponding data in the control memory (CTM) is transferred to highway gate flip-flops ($HWG_0$ to $HWG_7$) on a bitwise basis. The control memory (CTM) has stored therein bits the number of which is equal to (the number of highways)×(the number of channels), as shown in FIG. 8(2). The individual bits are independently set by an external processor in a manner described later. Accordingly, the highway gate flip-flops ($HWG_0$ to $HWG_7$) are set or reset according to the contents of the control memory (CTM), and only when they are in the set state, the outputs from the parallel-serial converters ($HPS_0$ to $HPS_7$) are transferred via bus drivers (BD) to output highways (THWY). When they are in the reset state, the outputs of the bus drivers (BD) are in a high-impedance state, in which they can be wired-ORed with the output of a highway switching circuit described later. The aforementioned conference processing of one trunk is executed, as shown in FIG. 5, in 15.625 µs allocating to four channels which is obtained by equally dividing into one-eighth a transmission time 125 µs of 32 channels. The process of operation concerning one trunk is shown in detail in the timing chart of FIG. 9 and its outline is as follows:

In a trunk memory (TKM) in FIG. 3, as depicted in FIG. 8(3), four words (15 bits/word) are assigned to one trunk, and each word has accommodated therein port information (the port number +ID) of four participants by a method described later. In this case, ID is individual information including a port loss of −0, a port loss of −1 and a connection flag, as shown in FIG. 8(3). To the trunk memory (TKM) is applied the output of the counter (CNT), as an address, via a multipexer ($MPX_0$) at the timings $T_0$ to $T_2$ and $T_4$ to $T_6$. The address changes for each timing and four words of the same trunk are successively read out word by word at the timings $S_0$ and $S_1$, and at the timings $S_2$ and $S_3$, four words of the same trunk are read out again in succession. Thereafter the same operation is repeated for the next trunk. As a result, the above operation takes place for eight trunks in 125 µs.

Now, when a first word (A) of a certain trunk of the trunk memory (TKM) is read out at the timings $T_0$ to $T_2$ of $S_0$, speech data (a) is read out from that one of the input memories ($INM_0$ to $INM_7$) which corresponds to the port number (output at $D_{0-4}$ and $D_{5-7}$ of the trunk memory (TKM))' and is input into a terminal $A_{0-6}$ of a multiplexer (MPX4). On the other hand, since the port loss of $-1$ (PL1) (derived at $D_{8-10}$ of the TKM) included in the individual information (ID) of the word (a) is applied to a terminal $A_{7-9}$ of the multiplexer (MPX4), the abovementioned speech data (a) is provided to that table of a μ-law to linear code translation table (MLT) in a read-only memory (ROM) which is specified by the port loss of $-1$, wherein it is converted from a PCM code (a) to a linear code (a') attenuated (or amplified) as predetermined, thereafter being delivered out from the read-only memory (ROM). The output of the read-only memory (ROM) is set in an area (ASP) of a speech register file (SPR) at the timing $T_2$. The output of the area (ASP) is applied to an adder (FA1), wherein it is added with the output of an adding register (ADD), and the added output is stored in the adding register (ADD) at the timing $T_3$.

In a similar manner, processing concerning second, third and fourth words in the aforementioned trunk is performed at the timings $T_4$ to $T_7$ of $S_0$, $T_0$ to $T_3$ of $S_1$ and $T_4$ to $T_7$ of $S_1$. Now, let B, C and D stand for the respective words of (b, c and d) for speech data corresponding to the port numbers in the words of (B, C and D and b', c' and d') for values into which the speech data of (b, c and d) are converted by the read-only memory (ROM). At the point of completion of the timing $T_3$ of $S_1$, the values of (b', c' and d') are set in areas BSP, CSP and DSP of the speech register file (SPR), respectively, and the adding register (ADD) is cleared to zero at the timing $T_1$ of $S_0$, so a value of $(a'+b'+c'+d')$ is stored in the adding register (ADD).

After this, the content (a') of the area (ASP) of the speech register file (SPR) is subtracted from the adding register (ADD) via the adder (FA1) at the timing $T_0$ of $S_2$, and as a result, the output (SPX) of the adder (FA1) goes to a value of $(b'+c'+d')$, which is input into a terminal $B_{0-12}$ of the multiplexer (MPX4).

On the other hand, the word A is read out again from the trunk memory (TKM) at the timing $T_0$ to $T_2$ of $S_2$, and since the port loss of $-0$ (PL0) (derived at $D_{11-13}$ of the TKM) in the individual information (ID) of the word A is applied to $B_{13-15}$ of the multiplexer (MPX4), the aforesaid speech data of $(b'+c'+d')$ is provided to that table of linear to μ-law code translation table (LMT) in the read-only memory (ROM) which is specified by the port loss of $-0$ (PL0), wherein it is converted from a linear code of $(b'+c'+d')$ to a PCM code $(b'+c'+d')'$ attenuated (or amplified) as predetermined, thereafter being output from the read-only memory (ROM). The output of the read-only memory (ROM) is loaded, at the timing $T_2$ of $S_2$, via a negative bus driver (NBA) into that one of the output memories ($OTM_0$ to $OTM_7$) which is specified by the port number in the word A.

Likewise, processing corresponding to the port numbers in the words B, C and D is performed at the timings $T_4$ to $T_6$ of $S_2$, $T_0$ to $T_2$ of $S_3$ and $T_4$ to $T_6$ of $S_3$. At the end of each timing, codes $(c'+d'+a')'$, $(d'+a'+b')'$ and $(a'+b'+c')'$ are stored in those of the output memories ($OTM_0$ to $OTM_7$) which correspond to the respective port numbers, thus completing the process concerning one trunk.

Since a processing time of 15.625 μs is needed for one trunk, processing for eight trunks takes a processing time of 125 μs.

As will be evident from the above, if the kinds of the μ-law to linear code translation table (MLT) for determining the input level and the linear to μ-law code translation table (LMT) for determining the output level for each participant's port are set in the trunk memory in FIG. 3 at each time when the conference trunk is used, then the voice level of conference communication can suitably be altered according to the kind of the participants, such as a long distance line, a short distance CO line, and an intercom etc.

For example, in a memory map of the read-only memory (ROM) shown in FIG. 8(4), let it be assumed that $x_0$, $x_1$, $x_2$, $x_3$, $x_4$, $x_5$, $x_6$ and $x_7$ provide attenuations of 0, 1, 2, 3, 4, 5, 6 and 7 dB, respectively, and $y_0$, $y_1$, $y_2$, $y_3$, $y_4$, $y_5$, $y_6$ and $y_7$ attenuations of 0, $-1$, $-2$, $-3$, $-4$, $-5$, $-6$ and $-7$ dB (i.e. amplifications of 0, $+1$, $+2$, $+3$, $+4$, $+5$, $+6$ and 7 dB), respectively. In the case of three-party communication among a CO line A having a line loss of $-4$ dB and intercom lines B and C having a line loss of 0 dB, if different kinds of tables $x_0$, $y_4$ and $x_4$, $y_0$ are provided for the CO line A and the intercom lines B and C, respectively, voices of the intercom lines B and C are provided on the CO line A at 0 dB without attenuation (received at $-4$ dB at the far end of the CO line A), voices of the CO line A and the intercom line C are both provided on the intercom line B at $-4$ dB, and voices of the CO line A and the intercom line B are both provided on the intercom line C at $-4$ dB. Accordingly, volume of the same voice level as in a two-party communication between the intercom line B or C and the CO line party A can be obtained in the three-party communication, and since no level difference exists between the CO line and the intercom lines, voices are easy to be heard. On the other hand, volume on the CO line A during the three-party communication is also at the same level as in the case where the CO line A is in the two-party communication with the intercom line. Therefore, switching from the two-party to the three-party communication does not create a sense of incongruity.

While in the above the code translation tables are set so that no difference in volume is present between the intercom line B or C and the CO line A or the intercom line C or B, it is evident that the code translation tables can be set in a manner to provide a difference of several dB between them and that voices can be amplified for the CO line with a large line loss, and the combination of code translation tables can be changed according to a particular purpose. Furthermore, it is also possible to employ different levels for two-party, three-party and four-party communications, respectively.

Figure 10:
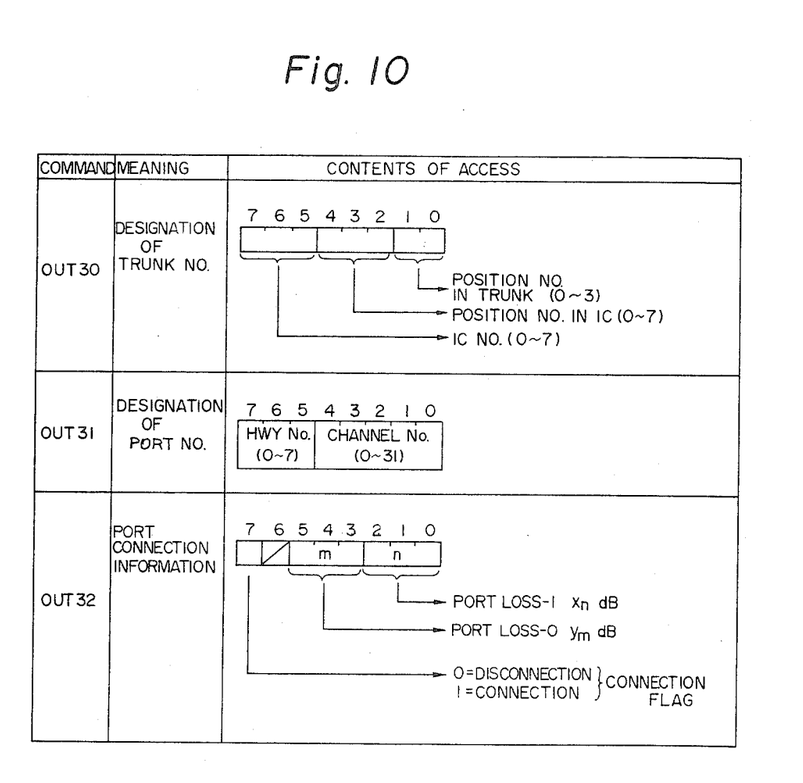
FIG. 10 is a diagram showing embodiments of conference trunk instructions indicating external interfaces in FIG. 3.
Figure 11:
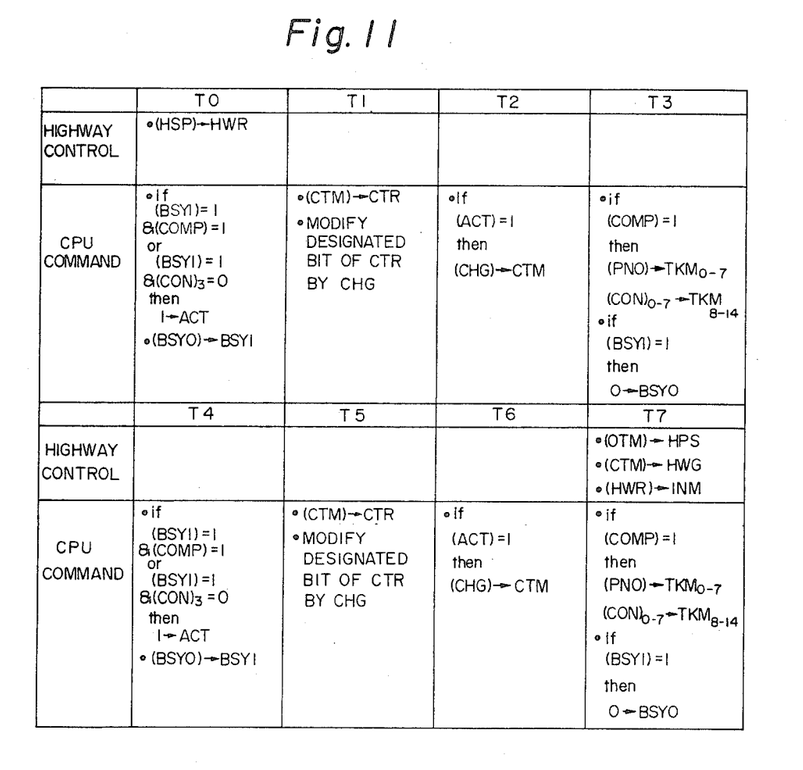

Memory maps of the trunk memory (TKM) and the control memory (CTM) are as shown in FIGS. 8(3) and (2), and required data is set in them by an external processor using output instructions depicted in FIG. 10. This is shown in detail in the timing chart of FIG. 11 (wherein the arrows indicate destinations), and its outline is as follows: An output command OUT30 sets the number of a conference circuit (an IC number), the trunk number in the conference circuit and the position number in the trunk, in a trunk number register (TNO), an output command OUT31 sets the participant's port number in a port number register (PNO) and then an output command OUT32 sets a connection flag to a "1" in a connection information register (CON). If a comparator (COMP) detects coincidence between the IC number set in the trunk number register (TNO) and an externally provided IC number, the output of the trunk number register (TNO) is applied to the multiplexer (MPX$_0$) at the timing T$_3$ or T$_6$ to produce an address of the trunk memory (TKM), and the contents of the port number register (PNO) and the connection information register (CON) are loaded via a bus driver (BD) into the trunk memory (TKM) at the position of a specified trunk number in such a format as shown in the memory map in FIG. 8(3).

On the other hand, the channel number in the output of the port number register (PNO) is applied to the multiplexer (MPX$_3$) to provide an address of the control memory (CTM), and data corresponding to a specified channel of the control memory (CTM) is set in a control memory register (CTR) at the timing T$_1$. The output of the control memory register (CTR) is applied to a bit change circuit (CHG), wherein its only one bit specified by the highway number in the output of the port number register (PNO) is changed to a "1". The output of the bit change circuit (CHG) is stored again via a bus driver (BD) in the control memory (CTM) at the aforesaid channel position at the timing T$_2$ or T$_6$.

The above has described the setting of one port in the trunk memory (TKM) and the control memory (CTM), and the operation for its resetting is identical with the above except in that the connection flag of the output command OUT32 is made a state of "0".

For setting or resetting a plurality of ports, it is necessary only to repeatedly execute the output commands OUT30, OUT31 and OUT32.

According to the above embodiment of the conference circuit, a maximum eight of such circuits can be connected in parallel, permitting the provision of a conference trunk having up to 64 trunks.

It is apparent that up to 256 trunks can be obtained by a two-bit increase in the bit lengths of the trunk number register (TNO) and the output instructions OUT30.

TABLE 2

| Symbol | Designation |
|---|---|
| BD | Bus Driver |
| CNT | Counter |
| CONM | Connection Memory |
| DEC | Decoder |
| FF | Flip-Flop |
| G | Gate |
| INR | Input Resister |
| MPX | Multiplexer |
| OUTR | Output Register |
| PS | Parallel-Serial Converter |
| SP | Serial-Parallel Converter |
| SPM | Speech Data Memory |

Figure 6:
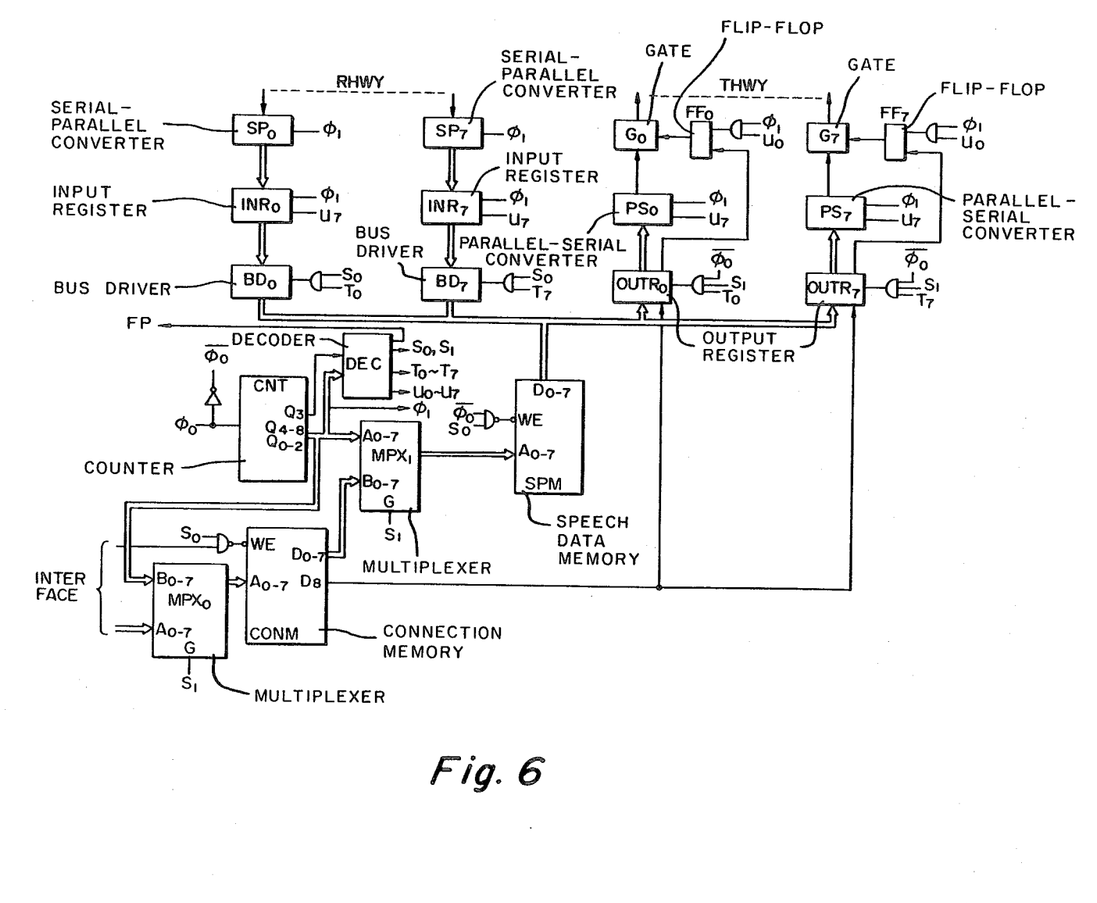
FIG. 6 is a block diagram illustrating an example of a highway switching circuit for use in the present invention.

FIG. 6 illustrates an example of the highway switching circuit 2 for use with the conference circuit 4 in the present invention. Table 2 shows the designations corresponding to symbols of its respective parts. The highway switching circuit depicted in FIG. 6 controls eight highways (32 channels/highway), each divided into input and output highways 1 and 3. Codecs corresponding to CO lines or telephone sets, though not shown, are each assigned the port number (the highway number + the channel number) through the fixed time slot system, and each codec conducts transmission and reception of PCM data between it and the input highways and the output highways at the timing determined by the port number.

Figure 7:
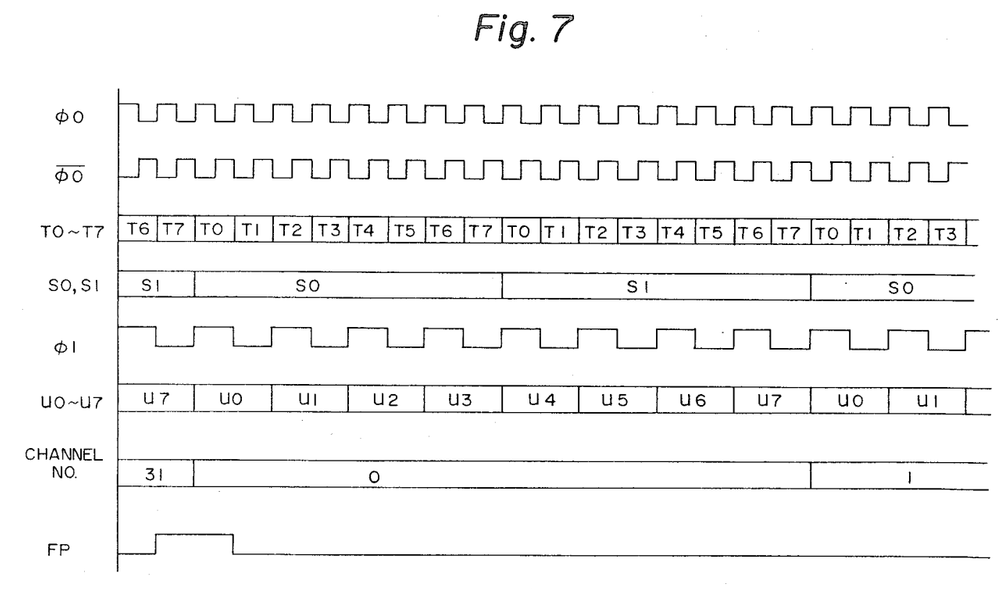
FIG. 7 is a timing chart showing the operation of the circuit exemplified in FIG. 6.
Figure 12:
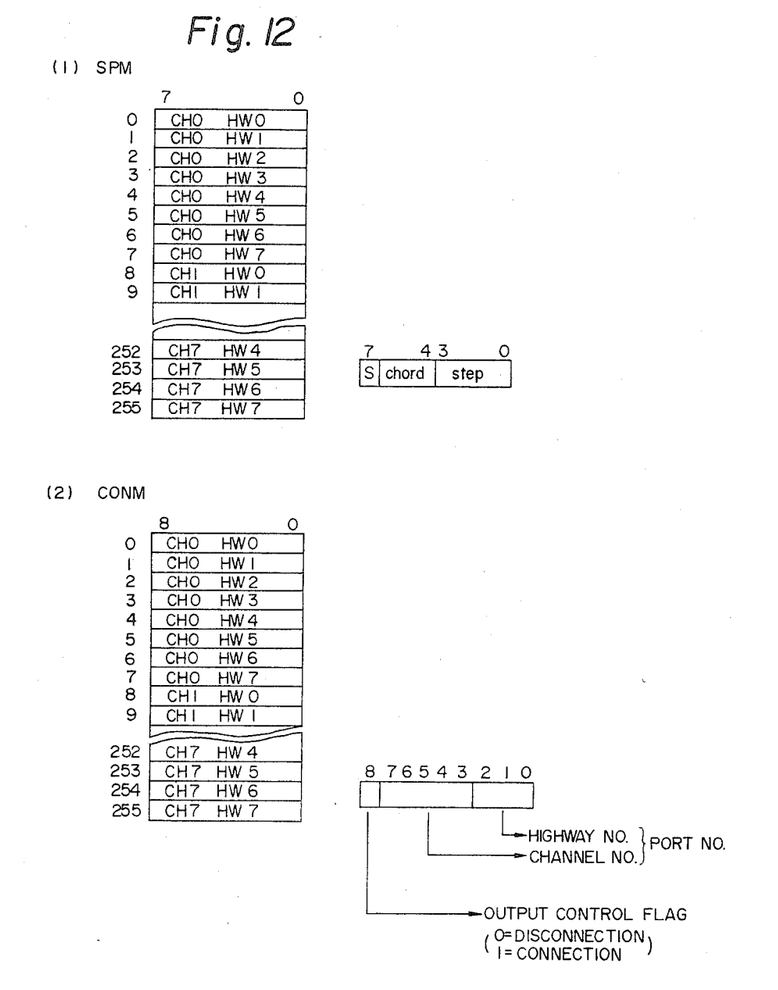
FIG. 12 shows memory maps of memories in FIG. 6.

A description will be given, with reference to FIG. 6, of the operation of the highway switching circuit 2. A counter (CNT) operates on external clock timings of $\phi_0$ and a decoder (DEC) creates timing slots T$_0$ to T$_7$, S$_0$, S$_1$, u$_0$ to u$_7$ and FP, as shown in FIG. 7. The timing slots T$_0$ to T$_7$ are to identify the highway numbers, the timing S$_0$ is assigned to the data input from the input highway (RHWY) to a speech data memory (SPM) and the signal S$_1$ is assigned to the data output from the speech data memory (SPM) to the output highway (THWY). Data on the input highway (RHWY), which is sent from the codec of each port number, is converted by one of serial-parallel converters (SP$_0$ to SP$_7$) which operate on clock timings of $\phi_1$, and is transferred to one of input registers (INR$_0$ to INR$_7$) at the end of the timing u$_7$ (i. e. at the beginning of the timing u$_0$). To the speech data memory (SPM) is applied an address from the counter (CNT) via the multiplexer (MPX$_1$) at the timing S$_0$. Since this address is updated upon each occurrence of the clock timings of $\phi_0$, the data in the input registers (INR$_0$ to INR$_7$) is sequentially loaded into the speech data memory (SPM) via bus drivers (BD$_0$ to BD$_7$) selected by the timing slots T$_0$ to T$_7$, as shown in FIG. 12(1). In FIG. 12(1), reference characters CHm and HWn indicate speech data which is input from the port corresponding to an mth channel of an nth highway, and each data is composed of a (+) or (−) sign (S), a chord and a step. On the other hand, a connection memory (CONM) is supplied with an address from the counter (CNT) via the multiplexer (MPX$_0$) at the timing S$_1$. Of the contents of the connection memory (CONM) shown in FIG. 12(2) (wherein CHm and HWn indicate, respectively, the port number and an output control flag of the destination from which the speech data is delivered to the port corresponding to the mth channel of the nth highway), read out by the above address, the port number of the destination is provided as an address via the multiplexer (MPX$_1$) to the speech data memory (SPM). The speech data read out by the address from the speech data memory (SPM) is successively loaded into output registers (OUTR$_0$ to OUTR$_7$) which are each selected by one of the timing signals T$_0$ to T$_7$ upon each occurrence of the clock timings of $\phi_0$. The contents of the output registers (OUTR$_0$ to OUTR$_7$) are stored in parallel-serial converters (PS$_0$ to PS$_7$) at the end of the timing signal u$_7$ (i.e. at the beginning of the timing signal u$_0$). Of the contents of the connection memory (CONM), the output control flags are directly loaded in the output registers (OUTR$_0$ to OUTR$_7$) at the timings T$_0$ to T$_7$ and thence loaded in flip-flops (FF$_0$ to FF$_7$) at the timing u$_0$. The parallel-serial converters (PS$_0$ to PS$_7$) operate on the clock timings $\phi_1$ and their outputs are provided on the output highway (THWY) via gates (G$_0$ to G$_7$) when the flip-flops (FF$_0$ to FF$_7$) are in their set state, but when the flip-flops (FF$_0$ to FF$_7$) are in their reset state, the outputs of the gates (G$_0$ to G$_7$) are in the high-impedance state, permitting the output of the conference circuit 4 to be wired-ORed.

Incidentally, frame pulses (FP) from a decoder (DEC) are provided to the conference circuit 4 for putting the channels of the conference circuit 4 and the highway switching circuit 2 in phase with each other. A writing operation of information in the connection memory (CONM) is effected by an external processor via an external interface circuit through the use of an output instruction at the timing S$_0$. This is accomplished by the same method as described previously in connection with the conference circuit 4, and hence will not be described.

As is evident from the above description, by exclusively setting, for a certain port, the connection flag of the trunk memory (TKM) of the conference circuit in FIG. 3 and the output flag of the connection memory (CONM) of the highway switching circuit in FIG. 6, a two-party communication or a conference communication can be implemented using only channels assigned to the port, and no particular channels are needed for the conference.

The above has described with respect to the basic circuit operations of the present invention. By parallel connections of a plurality of blocks each including the above-described circuits of the present invention, the circuit scale can be further extended. This advantage is, in practice, effective when the circuits are fabricated as an LSI.

The above is an embodiment of the present invention and should not be construed as limiting the invention specifically thereto. For example, the number of participants in one trunk may be three or five. The number of trunks used may also be determined. Furthermore, the number of highways used need not always be limited specifically to eight. While in the embodiment the input highways and the output highways are physically isolated from each other, it is evident that they can be isolated in terms of time but, physically, can be used so as to have both input and output highway functions. Moreover, it is also easy to employ, as the PCM code, an A-law code in place of the $\mu$-law code.

In short, various modifications may be effected without departing from the scope of the gist of the present invention. Hence the invention can be applied widely to various communication apparatus.

As described above, the present invention permits conference processing with very simple control. In addition, the circuits can be constructed as one module without being affected by external conditions, and hence is easy to fabricate as an LSI. Accordingly, the present invention is very suitable for fabrication as miniaturized and inexpensive equipment.

Moreover, according to the present invention, a conference circuit which dispenses with exclusive channels for conference use can be obtained with very simple control, effectively economizing channels and providing a sufficient number of conference trunks.

What we claim is:

1. A conference system in which communication signals received from a plurality of input highways on a time-division basis of PCM codes are conference-operated by digital switching and then supplied to a plurality of output highways on the time-division basis of PCM codes, comprising:

a conference circuit composed of an input buffer memory for storing all channel data of each frame of all the input highways; an output buffer memory capable of storing and outputting all channel data of each frame of all the output highways, first control means for reading out the data from the input buffer memory to control its time-division processing, an arithmetic unit for processing the data from the input buffer memory, second control means for inputting the data from the arithmetic unit into the output buffer memory, third control means for time-divisionally allotting the output data from the output buffer memory to each channel of all the output highways, and fourth control means for inhibiting said allotting of the output data for each channel;

wherein the conference circuit is connected in parallel to the input highways and the output highways of a two-party communication highway switching circuit capable of inhibiting said allocating of the output data for each communication channel, whereby during a two-party communication an output is inhibited from being provided on the output highway of the concerned communication channel of the conference circuit and during a conference an output is inhibited from being provided on the output highway of the concerned communication channel of the highway switching circuit, thereby permitting the conference using each channel of said highways, without the necessity of providing any particular channel for the conference.

* * * * *